Patented Jan. 4, 1927.

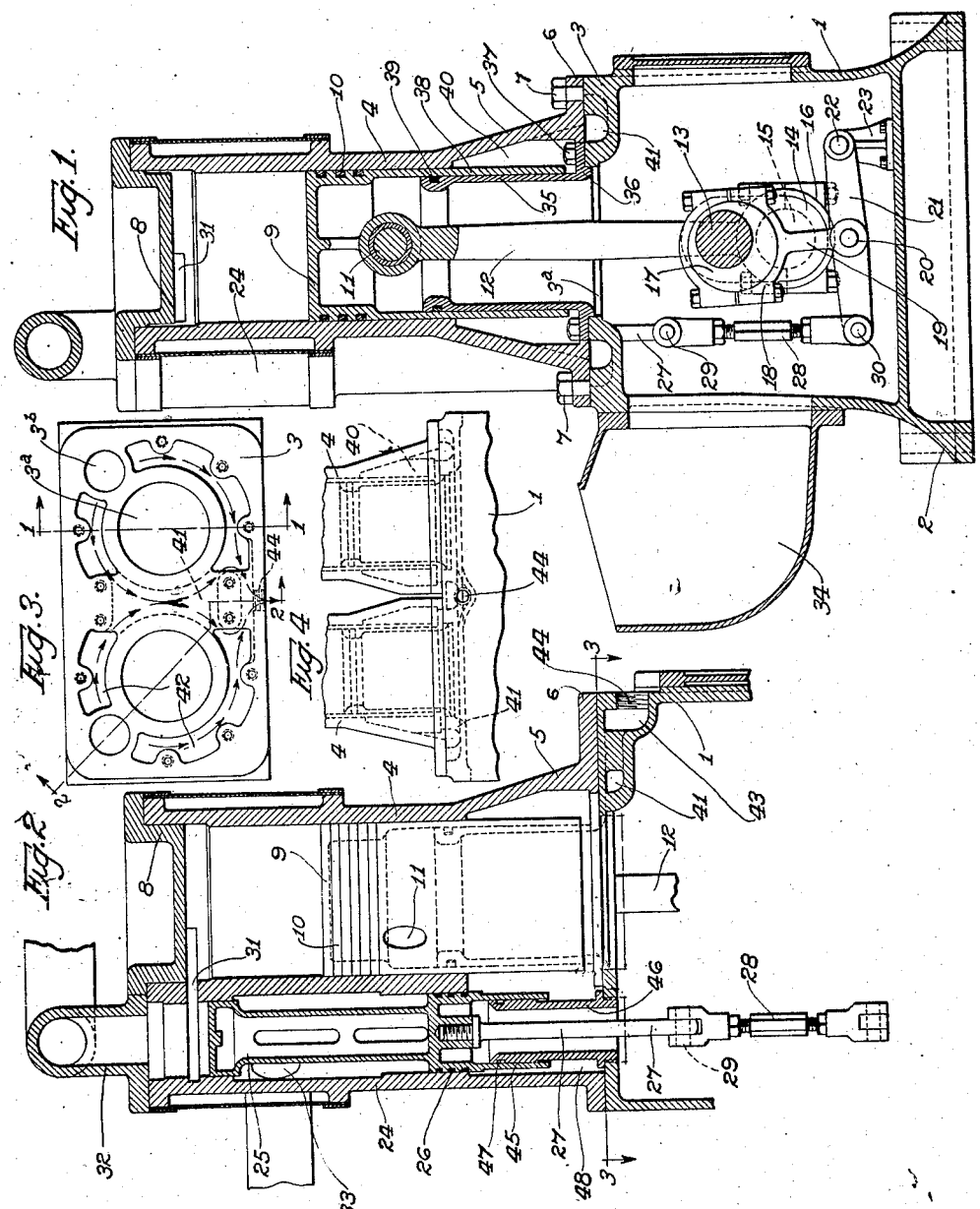

1,613,256

UNITED STATES PATENT OFFICE.

THEODORE WACHS, OF CHICAGO, ILLINOIS, ASSIGNOR TO THE E. H. WACHS CO., OF CHICAGO, ILLINOIS, A CORPORATION OF ILLINOIS.

LEAKAGE-CONTROLLING CONSTRUCTION.

Application filed January 24, 1921. Serial No. 439,560.

While the present invention is useful in connection with various forms of apparatus, as, for example, vacuum pumps, gas pumps, air compressors, gas compressors and internal combustion engines, it is herein shown as embodied in a single-acting steam engine of the enclosed type employed for driving mechanical stokers. Such engines are apt to be seriously neglected, as they are often located in such positions that they become coated with coal dust and ashes and are operated by relatively unskilled workmen.

Steam engines of the type just referred to are generally designed for automatic lubrication, and are constructed with an enclosed crank case for the protection of the bearings and the lubricating oil used upon them from the destructive effect of the dust and ashes about the engine. Frequently the lower portion of the crank case is employed as a reservoir for the operating supply of lubricating oil. In practice, it is impossible to entirely prevent leakage of steam past the piston, no known form of steam packing being capable of wholly preventing leakage of steam after the packing has been in use for a time. The steam and water of condensation which escape into the crank case mix with the oil and impair and eventually destroy the lubricating properties of the oil, thereby rendering necessary the withdrawal of the mixture from the crank case and the substitution of a fresh supply of oil. Such replacement of oil is not only a source of considerable expense, but is very likely to be overlooked under the conditions to which stoker-driving engines are subjected, and as a result such engines are apt to be seriously damaged for lack of lubrication.

The primary object of the present invention is to provide a construction in association with a cylinder or valve chamber by means of which any fluid leaking therefrom may be controlled to prevent damage from overflow or intermixture with other fluids.

Another object of the invention is to prevent leakage into the crank case or oil supply of steam or other pressure fluids from the cylinder or valve chamber in which the fluid is employed.

Other objects and advantages will be apparent in the following description.

In the accompanying drawings, Figure 1 is a sectional view of an enclosed single-acting steam engine of the type employed for operating mechanical stokers, the view being taken along the axis of one cylinder of a twin or duplex engine. Fig. 2 is a sectional view taken in the plane of dotted line 2—2 of Fig. 3. Fig. 3 is a view taken in the plane of dotted line 3—3 of Fig. 2. Fig. 4 is a fragmental elevation.

Referring to Figs. 1 and 2, the numeral 1 indicates a crank case having a base 2 adapted to be secured to a suitable foundation. The upper wall 3 of the crank case supports a pair of upright cylinders 4. The lower end of each cylinder is provided with a bell-shaped portion 5 terminating in a flange 6, which is secured to the crank case by means of cap screws 7. A cylinder head 8 closes the upper end of the cylinder bore.

A single-acting trunk piston 9 reciprocates within the cylinder, and is provided with the usual packing grooves 10 containing any ordinary or preferred steam packing to fit between the piston and the walls of the cylinder. A wrist pin 11, mounted in the side walls of the piston, carries a connecting rod 12 having a suitable bearing on the wrist pin, and depending into the crank case 1 through an opening 3ª in the upper wall thereof. A crank shaft 13, suitably journaled in the side walls of the crank case, is formed with a crank 14 having a journal or crank pin 15 to receive the bearing 16 carried by the connecting rod 12.

An eccentric 17, fixed on the shaft 13, rotates within the strap bearing 18 carried by an eccentric arm 19. The arm 19 terminates in a pivotal connection 20 with the mid-portion of a cross lever 21. The latter is pivoted at one end on a pin 22 fixed in a support 23 mounted in the base of the crank case.

A valve chest 24 preferably integral with the cylinder 4 contains a single-acting piston valve 25 operating on an axis parallel to the axis of the piston 9. Packing grooves 26 are provided in the lower bearing surface of the piston valve, and carry steam packing bearing upon the walls of the valve chest. A valve stem 27 fixed in the lower end of the valve 25 depends into the crank case 1 through an opening 3^b in the upper wall of the case, and carries at its lower end an adjustable link 28 pivotally connected to the stem at 29. The lower end of the link 28 is pivoted at 30 to the free end of the cross lever 21.

A steam port 31 controlled by the valve 25 opens from the valve chest 24 into the cylinder 4, live steam being admitted to the valve chest through the inlet port 33. An exhaust port is provided through the valve chest head 32. A governor housing 34 may be mounted on the side wall of the casing 1 providing a protective casing for a throttle governor (not shown) mounted therein.

The structure so far described comprises a self-contained single-acting steam engine in which all of the moving parts are entirely enclosed within the crank case and the cylinders.

The lower portion of the crank case 1 forms a reservoir designed to contain a quantity of oil for the automatic lubrication of the enclosed bearings. It is obviously essential to the proper lubrication of the engine parts, when subjected to continuous operation over long periods of time without attention, that the oil in the crank case be protected against impairment of its lubricating properties.

The difficulty in this respect inheres in the commonly practiced construction of single-acting engines of the enclosed type. The mounting of the cylinder directly upon the crank case, and the direct connection between the piston and the crank shaft, necessitate a large opening in the crank case wall beneath the cylinder, through which the swinging connecting rod operates. Similar conditions accompany the operating connections between the crank shaft and the valve.

It is recognized in practice that steam packing cannot be made continuously effective to entirely prevent the passing of steam around the piston after some wear. When so escaping and permitted to condense in the crank case and oil reservoir, the condensation water is churned with the oil by the revolving crank shaft and produces an emulsion of greatly lessened lubricating value, resulting in the rapid wear of the bearings.

To obviate this difficulty which heretofore has been a serious problem in the construction of steam engines of the type herein described, I have provided means for positively preventing the condensation water of steam leaking past the piston or the valve from entering the crank case. I have provided also means for effectively collecting and draining away such condensation water from about the piston and the cylinder.

My construction to accomplish these ends comprises a cylindrical sleeve 35 mounted upon the upper wall 3 of the crank case about the opening 3^a and extending upwardly within the piston 9, the connecting rod 12 operating through the sleeve. The base of the sleeve 35 carries a flange 36 sealed to the casing wall and secured in position as by cap screws 37. The inner surface of the downwardly extending side wall 38 of the piston is in continuous operating contact with the outer surface of the sleeve 35, the latter being provided at its upper end with packing 39 positioned in an appropriate packing groove. It will now be apparent that any steam escaping from between the piston 9 and the walls of the cylinder 4 will pass into the chamber 40, formed between the sleeve 35 and the walls 5 of the bell-shaped lower portion of the cylinder.

The upper wall 3 of the crank case is cored about the base of the chamber 40 to form a drainage passage 41 having openings 42 (Fig. 3) into the chamber 40. Condensation water accumulating in the chamber 40 is drained in the direction indicated by the arrows in Fig. 3 to a well 43. A piping connection (not shown) is made with the tapped opening 44 to carry the water from the well 43.

Similar provision is made for preventing the escape to the crank case of steam leaking from the valve chest. The lower end of the piston valve 25 is provided with a cylindrical shell 45 extending downwardly to receive a sleeve 46 fixed in the upper wall 3 of the crank case, and through which operates the valve stem 27. The shell 45 and sleeve 46 are in continuous contact throughout the stroke of the valve 25, their bearing surfaces being supplemented by packing carried in a packing groove 47 about the upper end of the sleeve. An annular chamber 48 formed between the sleeve 46 and the walls of the valve chest communicates with the chamber 40 about the cylinder, and with the drainage openings 42. Condensation water from steam passing the piston valve will be collected and drained away in a similar manner to that occurring in the cylinder.

It will now be apparent that I have provided a leakage-controlling construction which accomplishes, when employed in an enclosed type of steam engine, the preservation of the lubricating oil from the destruction of its lubricating qualities by escaping steam and by the mixture of its condensation with the oil.

It will be apparent also, that in the adaptation of my invention to a pump, a compressor or to an internal-combustion engine, the device effectively prevents the escape of oil from the crank case to the compression cylinders.

While I have illustrated and described in detail a preferred embodiment of my invention, it is to be understood that the disclosure herein is for purposes of illustration only, and that modifications and variations will naturally occur to those skilled in the art. I aim in the subjoined claims to cover all such legitimate variations and modifications.

I claim as my invention:

1. In combination with a cylinder, a piston reciprocating in the cylinder having a closed end subject to a pressure fluid in said cylinder and having an open end, and a stationary sleeve extending within the open end of said piston and having bearing contact with the inner surface thereof, the sleeve and the cylinder wall forming an annular chamber, the pressure in said chamber being maintained below the pressure in the cylinder whereby leakage along the piston walls is in a direction away from the closed end of the cylinder into said chamber.

2. In combination with a cylinder, a reciprocatory piston operable in the cylinder in one direction under the action of pressure fluid, a crank case, and a stationary sleeve having telescoping engagement within said piston to prevent leakage of the pressure fluid past said piston to said crank case.

3. In combination with a cylinder, a reciprocatory piston operable in the cylinder under the action in one direction of a pressure fluid, a crank case having lubricant therein, and a stationary sleeve supported on said crank case between it and the cylinder and having telescoping engagement with the inside of said piston whereby to prevent leakage between said cylinder and said crank case or between said crank case and said cylinder.

4. In combination, a cylinder having a flaringly open end, a reciprocatory piston operable therein, the piston having a sleeve extension, and stationary means having telescoping engagement with said piston inside the sleeve to direct escaping fluid from the open end of said cylinder.

5. In a device of the class described having a cylinder mounted on a support and having a reciprocatory piston carrying a connecting rod extending through an opening in said support, means for preventing the flow of escaping fluid through said opening, comprising a tubular member adapted to be mounted on said support to seal said opening and to operatively engage said piston internally in fluid-tight continuous bearing contact.

6. In combination, a cylinder, a support for the cylinder, a reciprocatory piston having tubular side walls, a stationary tubular member having telescopic engagement within said piston, said member forming with said cylinder and said support a receiver for collecting condensation water, and means for draining the said receiver.

7. In combination, a casing having a port for the passage of pressure fluid, a movable member in said casing operable to control the passage of fluid through said port, means for actuating said member, said means extending through an opening in said casing, and a tubular element fixed in said opening about said means, said tubular element having operative bearing contact with a portion of said movable member throughout its range of movement to effect a closure of said opening against said pressure fluid.

8. The combination of a cylinder having an open end, a crank case supporting the cylinder and having an opening registering with the open end of the cylinder, a piston operating in the cylinder having tubular side walls opening toward the crank case, a connecting rod attached to said piston and extending through said opening, a tubular member mounted on said crank case and effecting a sealed joint therewith about said opening, said tubular member extending into said cylinder and operatively engaging internally the side walls of said piston, whereby fluid escaping between the walls of said cylinder and said piston will be diverted from said opening in the crank case, and means to carry off the fluid.

9. In a steam engine having a crank case, a single acting cylinder, a bell-shaped extension formed on the open end of said cylinder and secured to said crank case, a piston having tubular side walls extending into said bell-shaped extension, a sleeve secured to said crank case within said bell-shaped extension and operatively engaging the inner surface of the side walls of said piston, whereby steam and its condensation which may escape between said cylinder and said piston will be collected between the walls of said extension and said sleeve, and the top of the crank case, and exit means for the leakage whereby to conduct it away from the collecting space.

10. In a steam engine, a cylinder having an end portion of substantially greater inner cross dimension than the cylinder bore, a tubular sleeve positioned within said end portion spaced therefrom and concentric with the cylinder bore, a base supporting said cylinder and said sleeve and forming a closure of the space between said end portion and the sleeve, a piston having tubular side walls extending into said end portion and operably engaging said sleeve externally in telescopic relation, and means for draining the space between said cylinder and said sleeve.

11. In a steam engine having a cylinder, a valve chest and a crank case, the combination of a valve operating in the valve chest, a tubular shell carried by said valve and positioned with its axis coincident with the axis of movement of said valve, a tubular sleeve mounted on the crank case and having telescopic operative engagement with said shell, and an actuating stem carried by said valve and extending through said shell and sleeve into said crank case.

12. In combination, a crank case having an upper wall, a cylinder supported thereon, a reciprocating piston in the cylinder, and a stationary sleeve mounted on said upper wall of the crank case and having telescopic engagement within said piston, the walls of said cylinder being arranged at one end to form an enclosed chamber about said sleeve for confining liquid escaping from said cylinder, said upper wall of the crank case having passages formed in its structure adapted to conduct said liquid from said chamber outside of said crank case.

13. In combination, a cylinder having an extension with an enlarged cross area at one end, a piston having a tubular extension operable in the cylinder, a stationary sleeve positioned in said enlarged end of the cylinder and spaced from its walls, said sleeve having telescopic engagement with the inside of the tubular extension of said piston, and a support for said cylinder and said sleeve arranged to effect a closure of the space between their respective walls, said support having drainage passages underlying and opening into said space.

14. In combination, a cylinder having a piston, a valve chest associated with said cylinder and having a valve, a crank case supporting said cylinder and said valve chest and having openings thereinto respectively, and sleeves extending from said openings into the cylinder and valve chest to prevent the flow therethrough of fluid escaping from said cylinder or valve chest, the supporting wall of said crank case surrounding said openings having open drainage passages therein underlying said cylinder and said valve chest.

In testimony whereof, I have hereunto set my hand.

THEODORE WACHS.